United States Patent [19]

Ito et al.

[11] Patent Number: 5,390,482
[45] Date of Patent: Feb. 21, 1995

[54] APPARATUS AND METHOD FOR SENDING OUT LINEAR MATERIAL

[75] Inventors: Yasushi Ito; Satoshi Ogawa, both of Kanagawa, Japan

[73] Assignee: Sumitomo Electric Industries, Ltd., Osaka, Japan

[21] Appl. No.: 948,416

[22] Filed: Sep. 22, 1992

[30] Foreign Application Priority Data

Sep. 24, 1991 [JP] Japan .................. 3-243788

[51] Int. Cl.⁶ ............................. D01H 1/00
[52] U.S. Cl. .......................... 57/66.5; 226/44
[58] Field of Search ........... 57/264, 59, 62, 63, 57/66.5, 68, 93, 94, 91, 6, 9, 11, 13, 293, 311, 352; 226/29, 44; 242/64, 75; 385/105

[56] References Cited

U.S. PATENT DOCUMENTS

| | | | |
|---|---|---|---|
| 2,956,391 | 10/1960 | Demmel et al. | 57/60 |
| 3,680,753 | 8/1972 | Shaw-Stewart | 226/25 |
| 3,715,877 | 2/1973 | Akachi | 57/94 |
| 4,129,238 | 12/1978 | Herd | 226/44 |
| 4,388,799 | 6/1983 | Vives | 57/6 |
| 4,549,391 | 10/1985 | Toda et al. | 57/59 |
| 4,574,574 | 3/1986 | Knaak | 57/264 |
| 4,587,801 | 5/1986 | Missout et al. | 57/6 |
| 4,676,054 | 6/1987 | In't Veld | 57/6 |
| 4,796,414 | 1/1989 | Bruggmann et al. | 57/9 |
| 4,833,871 | 5/1989 | Ogawa et al. | 57/93 |
| 4,903,473 | 2/1990 | Classen et al. | 57/93 |

FOREIGN PATENT DOCUMENTS

| | | |
|---|---|---|
| 0116174 | 8/1984 | European Pat. Off. . |
| 0316798 | 5/1989 | European Pat. Off. . |
| 5898489 | 6/1983 | Japan . |

Primary Examiner—Clifford D. Crowder
Assistant Examiner—Larry D. Worrell, Jr.
Attorney, Agent, or Firm—Cushman Darby & Cushman

[57] ABSTRACT

A arrangement is provided for paying-out a linear material. The method includes rotating a frame in a direction to pay-out the material; rotating a reel to unwind the material therefrom; utilizing a capstan assembly to restrict a pay-out speed of the material; applying a prescribed tensile force to the material by use of a dancer member disposed near the capstan assembly; detecting a position of the dancer member; and controlling the pay-out speed by the capstan assembly to keep the detected position unchanged.

4 Claims, 1 Drawing Sheet

5,390,482

APPARATUS AND METHOD FOR SENDING OUT LINEAR MATERIAL

FIELD OF THE INVENTION

The present invention relates to an apparatus and method for paying out a linear material such as a slot rod for manufacturing an optical fiber cable of the ribbon-slot type.

BACKGROUND OF THE INVENTION

An ordinary grooved slot rod 11 is shown in FIG. 2. Slot rod 11 includes a body 13 having a single or plurality of spiral grooves 14 formed on the outer circumferential surface thereof and extending at a certain spiral pitch along the longitudinal direction of the body. A tension-withstanding wire 12 is provided in the central portion of the body. To assemble a ribbon-slot type optical fiber cable including rod 11 and optical fiber tapes, the rod is payed out from a reel, and the ribbons are inserted into the spiral grooves 14 of the body 13 of the rod by an insertion device. Since the spiral grooves 14 are formed spirally along the longitudinal direction of the body 13, the optical fiber ribbons need to be guided into the grooves.

FIG. 3 shows a conventional apparatus for paying out a slot rod 11. The apparatus includes a reel 101 having a rod 11 wound thereon in advance, a frame 102, a rotary shaft 103 supporting the reel at one end of the frame so as to pay out the rod in a direction perpendicular to the axis of the shaft, a disk 104 fastened to the frame, a pair of rollers 105 supporting the disk, a support member 106 for supporting the frame, and guide rollers 107 and 108 attached to the frame to guide the rod. The frame 102 can be rotated about the paying-out direction of rod 111, synchronously with the turning of the spiral grooves 14 thereof, by a driver (not shown). A caterpillar-type braking device 109 is provided next to the apparatus in order to apply a desired tensile force to the rod 11. The braking device includes caterpillars 112 supported by pairs of rollers 110 and 111 extending over and under the rod 11 being payed out. The caterpillars 112 can be rotated about the paying-out direction of the rod 11, synchronously with the turning of the spiral grooves 14 thereof, as well as the frame 102 of the apparatus. In the conventional apparatus, the reel 101 is rotated about the rotary shaft 103 and the frame 102 is rotated about the paying-out direction of the rod 11, so that the rod is unwound from the reel and thus, payed out. In the braking device, the rod 11 is pushed between the upper and the lower caterpillars 112 so that the desired tensile force may be applied to the rod.

The tensile force applied to rod 11 by the caterpillar-type braking device 109 while being payed out by the conventional apparatus, is unstable due to changes in the pushing forces of the caterpillars 112 on the rod, and to frictional forces on the rotary sliding portions of the apparatus. Thus, the conventional apparatus does not ensure a consistent tensile force in operation. In addition, since the braking device 109 is provided separately from the paying-out apparatus, the size of an entire machine is large.

SUMMARY OF THE INVENTION

It is an object of the present invention to obviate the inadequacies of the prior art as discussed above. The present invention provides a linear material paying-out apparatus and method whereby a tensile force applied to a linear material can be accurately controlled so that a high quality optical cable can be assembled.

According to the claimed method, a frame supporting a reel on which the linear material is wound, is rotated about the paying-out direction so as to pay out the material. The reel is rotated to unwind the material therefrom. The paying-out speed of the material is restricted by a capstan assembly. Tensile force is applied to the material by a dancer member provided downstream of the capstan assembly with regard to the paying-out direction. The position of the dancer member is detected, and the paying-out speed is controlled by the capstan so that the position of the dancer member remains unchanged.

In accordance with a further aspect of the invention, an apparatus for sending-out linear material is provided. The apparatus includes a frame for supporting a reel on which the material is wound. The frame is rotatable about the paying-out direction. A capstan assembly is provided, supported in the frame to restrict the paying-out speed. A dancer member is provided downstream of the capstan assembly to apply a prescribed tensile force to the material through the action of a spring. Means are provided for detecting the position of the dancer member.

Linear material unwound from the reel is supported by the capstan assembly including a pair of capstan units. The prescribed tensile force is applied to the material by the dancer member. The paying-out speed of the material is controlled by the capstan assembly to accurately regulate the tension of the material.

DETAILED DESCRIPTION OF THE INVENTION

Figure 1:
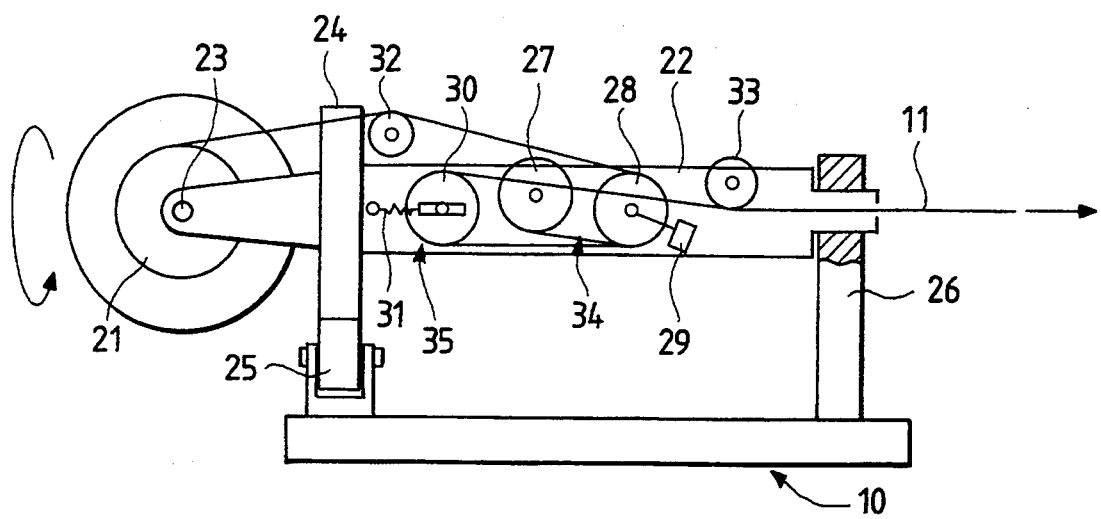
FIG. 1 is a schematic view of a linear material paying-out apparatus embodying the principles of the present invention.
Figure 2:
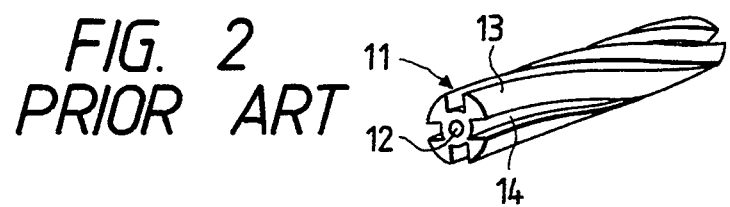
FIG. 2 (Prior Art) is a perspective view of a slot rod as a linear material.
Figure 3:
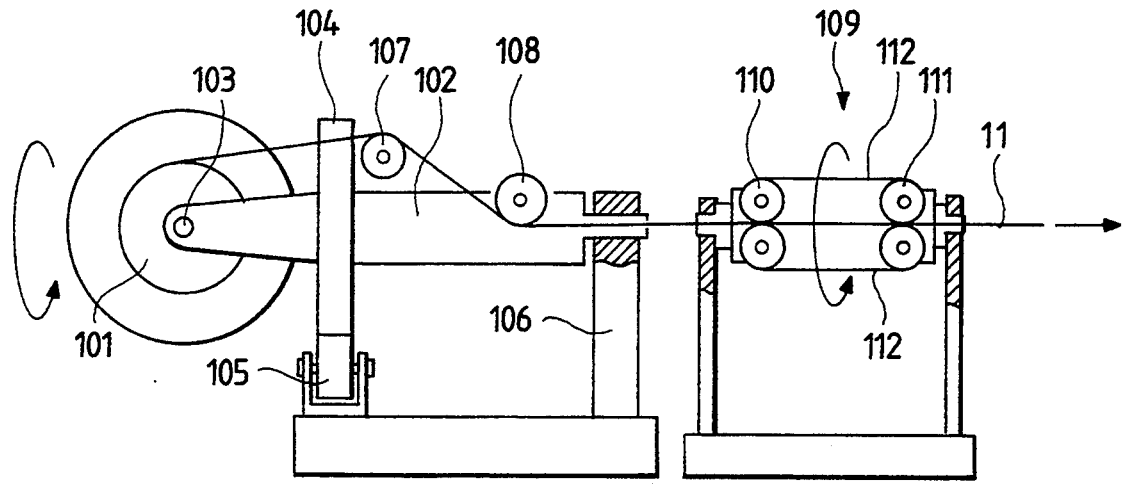
FIG. 3 (Prior Art) is a schematic view of a conventional linear material paying-out apparatus.

FIG. 1 shows a linear material paying-out apparatus 10 according to the invention. The apparatus 10 includes a reel 21 having a slot rod 11 wound thereabout. The rod 11 is the linear material to be payed out. The apparatus includes a frame 22, a rotary shaft 23 for supporting the reel at one end of the frame so as to pay out the rod in a direction perpendicular to the axis of the shaft, a disk 24 fastened to the frame, a pair of rollers 25 for supporting the disk, and a support member 26 for supporting the frame. The frame 22 can be rotated about the direction that the rod 11 is sent-out, synchronously with the turning of the spiral grooves 14 thereof, by a driver (not shown).

The apparatus 10 includes a capstan assembly 34 on which rod 11, to be payed out, is wound and supported. The capstan assembly 34 keeps the paying-out speed of the rod constant. The capstan assembly 34 includes a pair of axially spaced capstan wheels 27 and 28 being rotatably supported by the frame 22. A drive motor 29 is connected to the capstan wheel 28.

The apparatus 10 further includes a dancer member 35 for applying a prescribed tensile force to the rod 11. The dancer member 35 includes a dancer wheel 30 rotatably supported near the capstan wheel 27 and movable within a prescribed range toward and away from capstan wheel 27.

An urging spring 31 is provided between the dancer wheel 30 and the frame 22 for urging the dancer wheel 30 within the prescribed range.

A sensor (not shown) is attached to the frame 22 in order to detect the position of the dancer wheel 30 within the prescribed range. The sensor is connected to a controller (not shown) provided to control the motor 29 for driving the capstan wheel 28. The apparatus 10 further includes guide rollers 32 and 33 for guiding the rod 11 while it is being payed out.

The slot rod 11 is payed out by the apparatus 10 while being unwound from the reel 21, guided by the guide rollers 32 and 33 and engaged on the capstan wheels 28 and 27 and the dancer wheel 30. At that time, the rod 11 is moved forth by the capstan wheel 28 being rotated by the motor 29. A prescribed tensile force is applied to the rod 11 through the action of the urging spring 31 as the rod passes on the dancer wheel 30. At that time, the dancer wheel 30 is held in a predetermined position within the prescribed range due to the balance between the urging force of the urging spring 31 and the tension of rod 11. The position of the dancer wheel 30 is detected by the sensor. The motor 29 is controlled by the controller depending on the result of the sensed detection, to regulate the rotational speed of the capstan wheel 28 in order to keep the tension of the rod 11 within a desired value.

The tension of such a slot rod was actually measured while the rod was being pay out by the apparatus 10. The outside diameter of the rod 11, that of a tension-withstanding steel wire provided in the central portion of the body of the rod, and the send out speed of the rod were 10.5 mm, 1.6 mm, and 25 m/min, respectively. Portions of the rod were made of high-density polyethylene. TABLE 1 shows the measurement results of the invention compared with that of a conventional apparatus.

TABLE 1

|  | Conventional Apparatus | Apparatus 10 |
| --- | --- | --- |
| Tension (50 kg in target value) | (50 ± 7) kg | (50 ± 2) kg |
| Entire machine length | 15 m | 11 m |

As evident from TABLE 1, the tension of the rod 11 is kept more stable with the apparatus 10 than with the conventional apparatus.

In the linear material paying-out method and linear material paying-out apparatus which are provided in accordance with the present invention, the paying-out speed of a linear material unwound from a reel is restricted and controlled by the capstan assembly 34. A prescribed tensile force, which can be accurately controlled, is applied to the material by a dancer member 35 to stabilize the tension of the material. For that reason, a high quality optical fiber cable, for example, can be manufactured from such a linear material through the use of the method and the apparatus of the invention.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method for paying out linear material which is disposed about a reel supported by a frame, the method comprising the steps of:
    rotating said reel to unwind the material therefrom;
    directing the material to a capstan assembly separate from said reel, said capstan assembly including a pair of axially spaced, rotatably supported wheels, one of said wheels being coupled to a motor;
    restricting a pay-out speed of the material with said capstan assembly;
    directing the material to a dancer member, said dancer member being disposed downstream of said capstan assembly;
    applying a prescribed tensile force to the material by use of said dancer member;
    detecting a position of said dancer member;
    controlling said pay-out speed by said capstan assembly to keep said detected position unchanged; and
    rotating said frame about an axis of which the material is payed out, said material including spiral grooves which are turned, said frame being rotated synchronously with the turning of said spiral grooves;
    wherein the step of controlling the pay-out speed of the capstan assembly includes providing a signal so as to control rotation of said motor for driving said one wheel to control said pay-out speed.

2. The method according to claim 1, wherein the step of applying a prescribe tensile force includes one of moving said dancer member toward and away from said capstan assembly in a direction parallel to a rotation axis of said frame.

3. An apparatus for paying out a linear material comprising:
    a reel having the linear material wound thereon, said reel being rotatable so as to pay-out the material therefrom,
    a frame supporting said reel, said frame being rotatable about an axis thereof;
    a capstan assembly supported on said frame downstream of said reel, for restricting pay-out speed of said linear material;
    a dancer member disposed downstream of said capstan assembly for applying a prescribed tensile force to said material;
    means for detecting the position of said dancer member, said detecting means cooperating with said capstan assembly so as to control said pay-out speed to keep said detected position unchanged;
    wherein said capstan assembly includes a pair of axially spaced, rotatably supported wheels, one of said wheels being coupled to a motor, said detecting means providing a signal so as to control rotation of said motor for driving said one wheel to control said pay-out speed.

4. An apparatus according to claim 3, wherein said dancer member includes a rotatably supported wheel and a spring fixed between said frame and said wheel, said wheel being urged by said spring within a prescribed range toward and away from said capstan assembly.

* * * * *